United States Patent
Gelikonov et al.

(10) Patent No.: US 8,488,124 B2
(45) Date of Patent: Jul. 16, 2013

(54) SPECTRAL REFLECTOMETRY METHOD AND DEVICE

(75) Inventors: Grigory Valentinovich Gelikonov, Nizhny Novgorod (RU); Valentin Mikhailovich Gelikonov, Nizhny Novgorod (RU); Pavel Andreevich Shilyagin, Nizhny Novgorod (RU)

(73) Assignee: Limited Liability Company "Biomedical Technologies", Nizhny Novgorod (RU)

( * ) Notice: Subject to any disclaimer, the term of this patent is extended or adjusted under 35 U.S.C. 154(b) by 0 days.

(21) Appl. No.: 13/351,444

(22) Filed: Jan. 17, 2012

(65) Prior Publication Data

US 2012/0182560 A1 Jul. 19, 2012

Related U.S. Application Data

(63) Continuation of application No. PCT/RU2010/000394, filed on Jul. 15, 2010.

(30) Foreign Application Priority Data

Jul. 17, 2009 (RU) .............................. 2009127676

(51) Int. Cl.
*G01J 3/45* (2006.01)

(52) U.S. Cl.
USPC ............................ 356/451; 356/479; 356/497

(58) Field of Classification Search
USPC ........................................ 356/451, 479, 497
See application file for complete search history.

(56) References Cited

U.S. PATENT DOCUMENTS

| 6,985,232 B2 * | 1/2006 | Sezginer ..................... 356/451 |
| 7,088,451 B2 | 8/2006 | Sezginer | |
| 2008/0152353 A1 * | 6/2008 | de Boer et al. ............... 398/159 |

FOREIGN PATENT DOCUMENTS

| JP | 200911 15503 A | 5/2009 |
| RU | 2247938 C1 | 3/2005 |

OTHER PUBLICATIONS

Leitgeb et al., "Phase-shifting algorithm to achieve high-speed long-depth-range probing by frequency-domain optical coherence tomography", Optics Letters, vol. 28, No. 22, Nov. 15, 2003, p. 2201-2203.
Jun Ai et al., "Synchronous self-elennination of autocorrelation interference in Fourier-domain optical coherence tomography", Optics Letters, vol. 30, No. 21, Nov. 1, 2005, p. 2939-2941.
International Search Report from correspondent International Application No. PCT/RU2010/000394 filed Jul. 15, 2010, mailed Feb. 24, 2011.

* cited by examiner

*Primary Examiner* — Tarifur Chowdhury
*Assistant Examiner* — Jonathon Cook
(74) *Attorney, Agent, or Firm* — Patentbar International PC

(57) ABSTRACT

An optical low-coherence reflectometry with spectral reception for obtaining images without coherent noise caused by self-interference of the radiation scattered from the studied object and by spurious reflections in the optical path of the system is disclosed. Two or more consecutive measurements of the interference spectrum are made. During at least one measurement of the interference spectrum by means of the interference control unit the phase between the interfering parts of the radiation is modulated by a certain law during exposure, which results in averaging and zeroing of the cross-correlation (useful) component of the registered spectrum, and during at least one additional measurement of the interference spectrum, the phase between the interfering parts of the radiation is not modulated during exposure. The phase between the interfering parts of the radiation may be set to be different in additional measurements of the interference spectrum.

10 Claims, 3 Drawing Sheets

SPECTRAL REFLECTOMETRY METHOD AND DEVICE

RELATED APPLICATIONS

This application is a continuation of International Application PCT/RU2010/000394 filed on Jul. 15, 2010, which is turn claims priority to Russian Patent Application RU 2009127676 filed on Jul. 17, 2009, both of which are incorporated hereby in their entirety.

FIELD OF THE INVENTION

The invention relates to optical low-coherence reflectometry with spectral reception and may be used for obtaining images, which are free from coherent noise caused by self-interference of radiation scattered from the sample under investigation and by spurious reflections in the optical path of the system.

Reflectometry methods of determining the profile of back-scattering and reflection in a studied sample are broadly used both in technology and in various medical and biological applications, in optical coherence tomography, in particular. Spectral optical reflectometry devices have demonstrated their ability of faster imaging the internal scattering structure of samples as compared to traditional correlation techniques. The operation of spectral reflectometry is based on measurement of the optical spectrum of interference of broadband reference radiation and the radiation scattered in the sample in the interferometer and subsequent reconstruction of the cross-correlation function corresponding to in-depth distribution of the scatterers. However, for optimization of these devices aimed at broadening their dynamic range it is necessary to eliminate coherent noises caused by spectral inhomogeneity of the radiation source and by self-interference of the radiation backscattered by the studied sample that are superimposed on the useful signal, i.e. to eliminate the cross-correlation component of the optical interference spectrum.

BACKGROUND OF THE INVENTION

The method of spectral reflectometry and the device for its implementation were described by J. Ai and L. V. Wang in the paper <<Synchronous self-elimination of autocorrelation interference in Fourier-domain optical coherence tomography>>, Optics Letters, Vol. 30, No. 21, p. 2939-2941, 2005. The device comprises a broadband light source, an interferometer with a beam splitter in the sample arm, an interference control unit, a spectrometer, and a processing and visualization unit. The radiation from the broadband source is directed to the interferometer, part of the radiation scattered in the sample is withdrawn from the interferometer through the beam splitter and is directed to the spectrometer. The other part of the radiation scattered by the sample remains in the interferometer and is directed to the spectrometer only after being mixed with the reference part of the radiation. Both parts of the radiation are received by identical photoreceivers. Coherent noise is removed by measuring separate parts of the radiation. At the first stage, the total optical signal level is measured, for which the sample arm of the interferometer is blocked. At the second stage, the interference spectrum with coherent noises is measured. At the third stage, a spectrum without coherent noises is formed. The result is achieved by extracting from the interference spectrum with coherent noises the value of the total level of the optical signal. The drawback of the method and the device for its realization is a significant (up to four-fold) power loss of the radiation scattered by the sample due to takeoff of half of the power by the additional splitter on forward and backward passages. Besides, the interference control unit should be positioned immediately in the sample arm of the main interferometer, which greatly limits its area of applications.

The closest analog of the proposed method and device is the method and interference control unit described by R. A. Leitgeb, C. K. Hitzenberger, and A. F. Fercher in the paper <<Phase-shifting algorithm to achieve high-speed long-depth-range probing by frequency-domain optical coherence tomography>>, Optics Letters, Vol. 28, No. 22, p. 2201-2203, 2003. The device comprises a broadband radiation source, an interferometer containing an interference control unit represented by a modulator of phase between the reference and sample parts of the radiation, a spectrometer, and a processing and visualization unit. The radiation from the broadband source transmitted through the main interferometer has a definite phase difference between the reference and sample parts of the radiation. The interference spectrum of the reference and the sample parts of the radiation is received by an array of spectrometer photoelements. Simultaneous processing of several, successively received interference spectra with different phase shifts between the reference and the sample parts of radiation allows eliminating the influence of sample's self-interference on the final image. However, this method and device may be used only for investigation of sessile samples with slow internal motions that do not disturb phase relations as a result of the Doppler effect arising on the movable scatterers. Otherwise, there appear image artifacts.

SUMMARY OF THE INVENTION

The object of the present invention is development of a method and a device for spectral reflectometry that would allow imaging absolutely without coherent noise and without loss of radiation power scattered by the studied sample at a sufficiently high speed of internal motions in the sample (10 and more times higher than the admissible values of speed in the closest analog).

The proposed method comprises two or more consecutive measurements of the interference spectrum, each including the following steps: direction of the optical radiation from a broadband light source to the interferometer; splitting of the radiation in the interferometer into the reference and the sample parts; registration by the spectrometer of the interference spectrum of the radiation reflected in the reference arm and backscattered from the sample; processing of the obtained data by the processing and visualization unit; elimination of coherent noise artifacts in the spectrum by simultaneous processing of two or more consecutively obtained data.

In the developed method during at least one measurement of the interference spectrum the phase between the reference and probing radiation is modulated by a predetermined law during exposure by means of the interference control unit, which results in averaging and, hence, zeroing of the cross-correlation (useful) component of the registered spectrum; wherein during at least one additional measurement of the interference spectrum the phase between the reference and probing radiation is not modulated during exposure.

In one embodiment of the method of spectral reflectometry, the phase between the reference and sample radiation is set to be different in additional measurements.

The developed device comprises a broadband light source, at least one interferometer comprising at least two optical paths, one of which is a reference path and the other is a sample path comprising a sample; at least one of the paths comprises an interference control unit, a spectrometer, and a processing and visualization unit.

In the developed device the interference control unit is arranged for modulating the phase between the reference and sample radiation during exposure of the photoreceiving elements of the spectrometer.

In one embodiment of the spectral reflectometry device, the interference control unit is an electro-optical unit.

In a second embodiment of the spectral reflectometry device, the interference control unit is a piezoelectric unit.

In a third embodiment of the spectral reflectometry device, the interference control unit is an optical fiber piezoelectric unit.

In a fourth embodiment of the spectral reflectometry device, the interference control unit is made on an electromagnetic base.

In a fifth embodiment of the spectral reflectometry device, the interference control unit is an electrostatic unit.

In a sixth embodiment of the spectral reflectometry device, the interference control unit is based on microelectromechanical systems (MEMS).

In a seventh embodiment of the spectral reflectometry device, the interference control unit is installed in an additional interferometer positioned in parallel or in series with the main interferometer.

The developed method and device allow imaging without coherent noise and without loss of radiation power scattered by the studied sample at a sufficiently high speed of internal motions in the sample (10 and more times higher than the admissible values of speed in the closest analog).

DETAILED DESCRIPTION OF THE INVENTION

Figure 1:
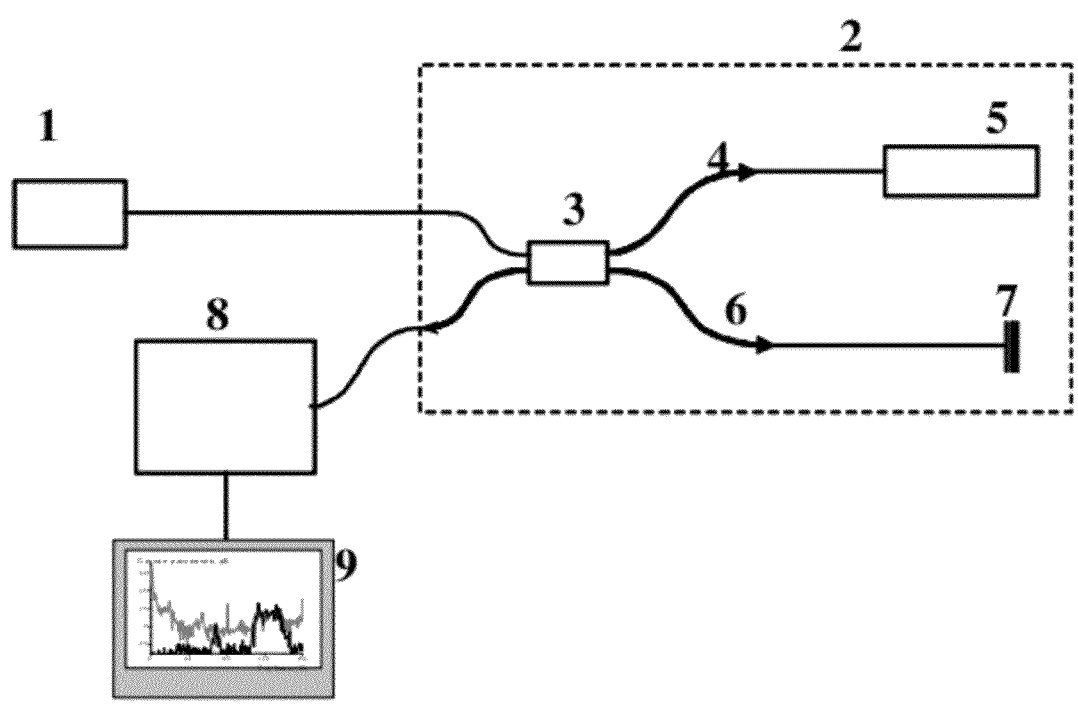
FIG. 1 illustrates an embodiment of the spectral reflectometry device.

The spectral reflectometry device as shown in FIG. 1 in a general embodiment comprises broadband light source 1; interferometer 2 comprising radiation splitter 3, reference path 4 with interference control unit 5, and sample path 6 comprising studied sample 7; spectrometer 8 with photoreceiving elements; and processing and visualization unit 9.

Operation of the spectral reflectometry device is outlined below in the description of an embodiment of the method of spectral reflectometry.

For acquiring images absolutely devoid of coherent noise without power loss of the radiation scattered by the studied sample two consecutive measurements are made.

During the first measurement of the interference spectrum by means of the interference control unit the phase between the interfering parts of the radiation is modulated by a predetermined law during exposure, leading to averaging and, hence, zeroing of the cross-correlation (useful) component of the registered spectrum.

Radiation from the broadband source 1 is directed to the interferometer 2, where it is directed along different optical paths: the reference path 4 and the sample path 6. In the sample path 6 the radiation is directed to the sample 7 and its backscattered component returns to the sample path 6. In the reference path 4 the phase between the reference and sample parts of the radiation is modulated by a predetermined law by means of the interference control unit 5. The radiation that has passed different optical paths 4 and 6 is mixed by the radiation splitter 3 and is fed to the spectrometer 8, where it is divided into separate spectral components received by separate photoreceiving elements. In the presence of phase modulation between the reference and sample parts of the radiation the interference on a separate photoreceiving element occurs with a different phase at different moments of time. This results in phase averaging of the signal of the interference arising in the interferometer 2, whereas the influence on the signal of the interference that is not related to the interference between the reference and sample parts of the radiation (self-interference) and of the inhomogeneity of the light source spectrum is retained. Thus, the spectrum received in the first measurement contains only coherent noise and has no cross-correlation component.

During the second measurement of the interference spectrum the phase between the reference and probing radiation is not modulated during exposure.

Radiation from the broadband source 1 is directed to the interferometer 2 through the splitter 3. In the interferometer 2 the radiation is directed along different optical paths: the reference path 4 and the sample path 6. In the sample path 6 the radiation is directed to the studied sample 7 and its backscattered component returns to the sample path 6. In the reference path 4 the phase between the reference and sample parts of the radiation is not modulated. On passing the interferometer 2 by different optical paths 4 and 6 the radiation is again mixed by the radiation splitter 3 and is fed to the spectrometer 8, where it is divided into separate spectral components received by separate photoreceiving elements. In the absence of phase modulation between the reference and sample parts of the radiation the interference on a separate photoreceiving element occurs with the same phase at different moments of time. This results in effective accumulation of the interference signal. Thus, the spectrum received in the second measurement contains both coherent noise and a cross-correlation component.

The interference spectrum without coherent noise is obtained as a result of extraction of the result of the first measurement from the second one in the processing and visualization unit 9.

The mathematical description of the operation of the device is presented below.

During the second measurement of the interference spectrum the phase between the reference and sample radiation is not modulated during exposure. In this case, the signal at the input of a separate photoreceiving element comprises three main components:

$$S(k)=E^2(k)|\int D(z)e^{2ikz}dz|^2+E^2(k)r^2+2E^2(k)r\int D(z)(\cos(2kz))dz,$$

where r is the coefficient characterizing reflection in the reference path of the interferometer, k is the wave number of the analyzed spectral component, E(k) is the amplitude of the electric field of the radiation incident on the studied sample, z is the coordinate ascending with increasing sample depth; the coordinate origin is fixed to the zero path-length difference of the interfering parts of the radiation, D(z) is the scattering coefficient characterizing the fraction of the radiation returning to the interferometer from depth z.

The third term is a cross-correlation component of the signal, containing useful information about scattering in the sample under investigation. The first two terms form a constant component corresponding to the sum intensity of the reference and scattered waves, and an autocorrelation component due to self-interference of the radiation scattered by the sample under study:

$$S(k)=S_{AC}(k)+S_{SCC}(k)+S_{CC}(k),$$

where $S_{CC}(k)$ is the cross-correlation (useful) component of the interference signal, $S_{AC}(k)$ is the autocorrelation component characterizing total power of the reference and returning waves, $S_{SCC}(k)$ is the result of mutual interference of all the components of the scattered wave. To exclude the influence of coherent noise defined by the sum $S_{AC}(k)+S_{SCC}(k)$ on the reconstructed scattering spectrum the interference control unit 5 is used. During the first measurement the radiation phase is modulated directly during exposure of the photoreceiving elements of the spectrometer.

In this case a signal received by a separate photoreceiving element may be represented in the form $$\tilde{U}(k) = \gamma \int_0^\tau \left[ E^2(k) \left| \int D(z)e^{2ikz} dz \right|^2 + E^2(k)r^2 + 2E^2(k)r \int D(z)(\cos(2kz + m \cdot F(t))) dz \right] dt,$$

where $\gamma$ is the coefficient taking into account capacity, quantum efficiency and susceptibility of the photoreceiving element, $\tau$ is the exposure time, m is the phase modulation amplitude, F(t) is the modulating function varying in the [−1; 1] interval.

The first two terms in the integrand do not depend on time, hence they are the same as in the absence of phase modulation. Only the third term in the integrand responsible for the cross-correlation function is time dependent:

$$\tilde{U}_{CC}(k) = \gamma 2E^2(k)r \int \left[ D(z) \int_0^\tau (\cos(2kz + \alpha + m \cdot F(t))) dt \right] dz$$

Mathematical transformations demonstrate that the cross-correlation component of the signal in the received spectrum is fully excluded if the condition $$\begin{cases} \int_0^\tau \cos(m \cdot F(t)) dt = 0 \\ \int_0^\tau \sin(m \cdot F(t)) dt = 0 \end{cases}$$

for the amplitude and shape of phase modulation of the optical radiation of the reference wave is satisfied.

Figure 2:
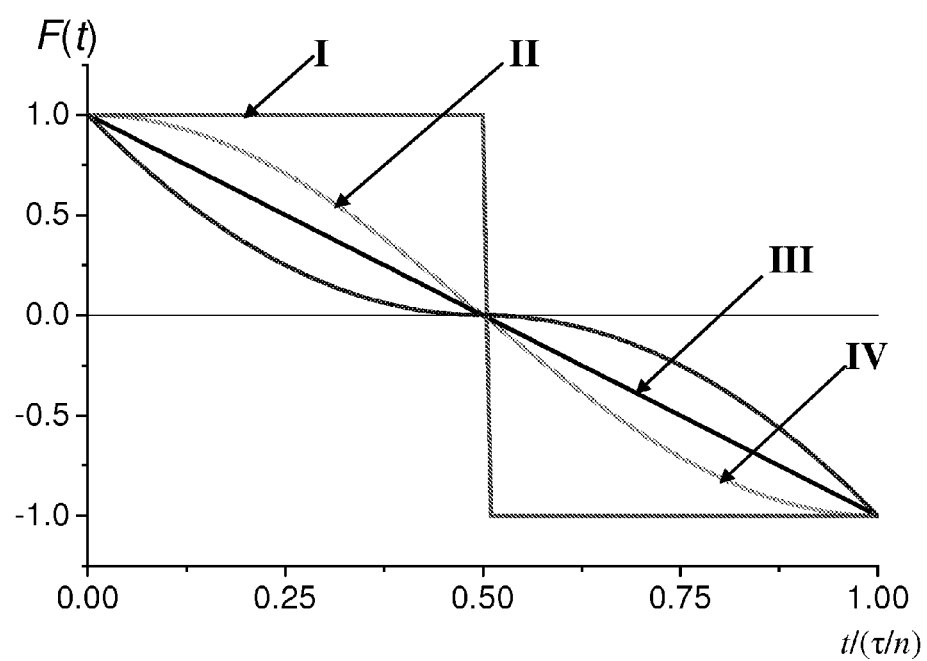
FIG. 2 represents the curves of phase modulation function F(t) meeting the condition of discrimination of the cross-correlation component in the received spectrum.

Particular cases of solution of this system—shapes of the phase modulation function F(t) meeting the condition of discrimination of the cross-correlation component in the received spectrum are presented in FIG. 2: 1—rectangular, 2—harmonic, 3—linear, and 4—cubic.

One of particular solutions of this system is rectangular phase modulation with the off-duty factor of 50% (curve I) and with modulation amplitude m=(2n+1)π, where n is an integer. Another particular solution of the system is harmonic modulation with a frequency multiple to half the inverse exposure time (curve II). In this case, the second equation is fulfilled independent of the magnitude of modulation amplitude m, and the second equation has roots coinciding with the roots of the zero-order Bessel function $J_0(m)=0$. Besides, two more curves (curve III and curve IV) satisfying the above system of integral equations are shown in FIG. 2. Note that the minimum phase modulation amplitude meeting the condition of discrimination of the cross-correlation component in the received spectrum grows with increasing number of the curve in FIG. 2. In the developed device and method the increase of the maximum admissible speed of internal motions in the sample that does not lead to distortions in the measurements of coherent noises is achieved by using modulation with a frequency multiple to the inverse exposure time. If the condition of multiplicity of the modulation frequency f and of the inverse exposure time $\tau$: $f=n\cdot\tau-1$ (n is a integer) is satisfied, the contribution of the phase incursion due to the Doppler shift during motion inside the sample reduces as n increases during the exposure. In particular, in the case of rectangular modulation it can be readily shown that the decrease of the magnitude of this contribution is proportional to n−1. This allows reducing substantially the influence of the motion in the sample on the resultant signal and, hence, to observe samples with internal speeds much higher than in the case of the closest analog.

Figure 3:
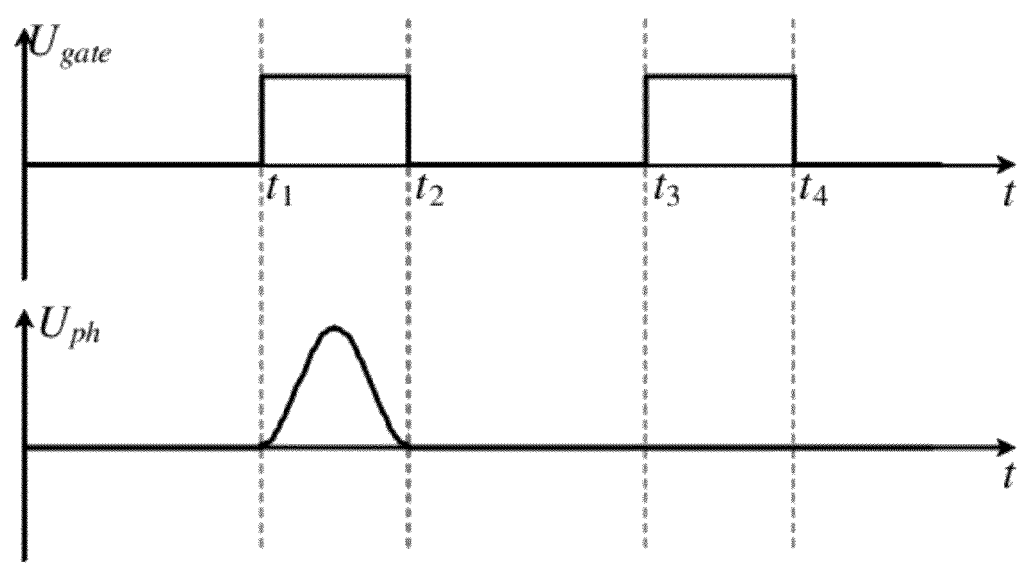
FIG. 3 represents the time diagrams explaining the work of the developed device and the method of spectral reflectometry permitting to obtain spectral reflectometry images absolutely without coherent noise and without loss of radiation power scattered by the studied sample at sufficiently speed of internal motions in the sample.

FIG. 3 represents the time diagrams explaining the work of the developed device and method of spectral reflectometry.

$U_{gate}$ is the control voltage that opens and closes the gate of the photoreceiving element of the spectrometer 8, $U_{ph}$ is the voltage supplied to the interference control unit 5.

When the phase between the interfering parts of the radiation in additional measurements of the interference spectrum is set to be different, the sign of the path-length difference between the reference and sample parts of the radiation may be found.

The use of an electro-optical interference control unit provides fast modulation of the phase difference between the reference and sample parts of the radiation in the absence of resonance eigenfrequencies that may distort the shape of the modulating voltage.

When the interference control is a piezoelectric unit, assemblage of the device is much easier and its cost reduces substantially.

When the interference control unit is an optical fiber piezoelectric unit, the radiation phase is controlled by fiber stretching, which permits using lower voltages to control the modulator.

When the interference control unit is an electromagnetic unit, the control voltage in the interference control unit may be reduced appreciably.

When the interference control unit is an electrostatic unit, the control current in the interference control unit may be reduced appreciably.

When the interference control unit is based on microelectromechanical systems (MEMS), the phase modulation in the interference control unit may be made nonuniform in the cross-section.

When the interference control unit is installed in an additional interferometer positioned in parallel or in series with the main interferometer, the architecture of the main interferometer may be left unchanged, which is advantageous, since making changes to the main interferometer may be a rather complicated task in some applications.

INDUSTRIAL APPLICABILITY

The developed spectral reflectometry device is based on up-to-date components. One of the embodiments of the spectral reflectometry device comprises a spectrometer based on the Dikson® VPH Transmission grating with spatial frequency 1145 l/mm and an array of photoreceiving elements Sensors Unlimited SU512LD-T1.

The developed method and spectral reflectometry device provide spectral reflectometry images absolutely devoid of coherent noises without loss of radiation power scattered by the studied sample at sufficiently high speeds of internal motions in the sample (10 and more times higher than the admissible values of speed in the closest analog). Several variants of the spectral reflectometry device with different versions of the interference control unit have been developed. All of them allow for coherent noise to be fully eliminated without loss of the radiation power scattered by the sample.

The developed spectral reflectometry device is ready for full-scale production.

What is claimed is:

1. A method for spectral reflectometry comprising at least two consecutive measurements of an interference spectrum, each including the following steps: directing an optical radiation from a broadband light source toward an interferometer, splitting the radiation in the interferometer into a reference and a sample part, registering an interference spectrum of a radiation reflected in a reference path of the interferometer and backscattered from a sample with a spectrometer, processing obtained data by a processing and visualization unit, and eliminating coherent noise artifacts in the spectrum by simultaneous processing data obtained from the at least two consecutive measurements, wherein during one of the at least two measurements of the interference spectrum the phase between the reflected reference radiation and the radiation backscattered from the sample is modulated by a predetermined law by means of an interference control unit during exposure of the photoreceiving elements of the spectrometer, which results in averaging the phase and, hence, zeroing of the cross-correlation (useful) component of the registered spectrum, and wherein during the remaining of the at least two measurements of the interference spectrum, the phase between the interfering parts of the radiation is not modulated during exposure.

2. The method of claim 1, wherein the phase between the reference and sample radiation is set to be different in additional measurements of the interference spectrum.

3. A spectral reflectometry device comprising a broadband light source for emitting optical radiation to perform at least two consecutive measurements of an interference spectrum, at least one interferometer comprising at least two optical paths, one of which is a reference path and the other is a sample path, at least one of the paths including an interference control unit, a spectrometer, and a processing and visualization unit;

wherein the interference control unit is arranged to modulate by a predetermined law the phase between interfering parts of the radiation directly during one of the at least two measurements of the interference spectrum during exposure of photoreceiving elements of the spectrometer; and wherein during the remaining of the at least two consecutive measurement of the interference spectrum, the phase between the interfering parts of the radiation is not modulated during exposure.

4. The device of claim 3, wherein the interference control unit is an electrooptical unit.

5. The device of claim 3, wherein the interference control unit is a piezoelectric unit.

6. The device of claim 3, wherein the interference control unit is an optical fiber piezoelectric unit.

7. The device of claim 3, wherein the interference control unit is an electromagnetic unit.

8. The device of claim 3, wherein the interference control unit is an electrostatic unit.

9. The device of claim 3, wherein the interference control unit is based on micromechanical systems (MEMS).

10. The device of claim 3, wherein the interference control unit is installed in an additional interferometer positioned in parallel or in series with the main interferometer.

* * * * *